(12) United States Patent
Kouyama et al.

(10) Patent No.: US 6,550,382 B1
(45) Date of Patent: Apr. 22, 2003

(54) PRINTING SYSTEM, PRINTING METHOD AND RECORDING MEDIUM

(75) Inventors: Satoshi Kouyama, Kyoto (JP); Humihiro Hatayama, Kyoto (JP)

(73) Assignee: Dainippon Screen Mfg., Co., Ltd., Kyoto (JP)

( * ) Notice: Subject to any disclaimer, the term of this patent is extended or adjusted under 35 U.S.C. 154(b) by 3 days.

(21) Appl. No.: 09/889,886

(22) PCT Filed: Nov. 22, 2000

(86) PCT No.: PCT/JP00/08260

§ 371 (c)(1),
(2), (4) Date: Jul. 24, 2001

(87) PCT Pub. No.: WO01/38092

PCT Pub. Date: May 31, 2001

(30) Foreign Application Priority Data

Nov. 24, 1999 (JP) ............................................. 11/332597

(51) Int. Cl.[7] ................................................. B41M 1/14
(52) U.S. Cl. ........................ 101/171; 101/211; 382/162; 358/500
(58) Field of Search ................................. 101/171, 211, 101/349.1, 401.1, 483; 382/162; 358/500, 515, 518, 523, 524

(56) References Cited

U.S. PATENT DOCUMENTS 5,058,500 A  * 10/1991  Mizuno ...................... 101/142
5,381,246 A  *  1/1995  Suzuki et al. ................ 358/500
5,890,820 A  *  4/1999  Handa ...................... 400/615.2
6,002,795 A  * 12/1999  Eames et al. ................ 382/167
6,198,840 B1 *  3/2001  Mitsuhashi et al. ......... 382/162

FOREIGN PATENT DOCUMENTS

| JP | 07-040644 | 2/1995 |
| JP | 08-267702 | 10/1996 |
| JP | 9-100 | 2/1997 |
| JP | 11-235810 | 8/1999 |

* cited by examiner

Primary Examiner—Stephen R. Funk
(74) Attorney, Agent, or Firm—McDermott, Will & Emery (57) ABSTRACT

The present invention aims at providing a printing system and technique correctly reflecting supplied color information, and a technique of managing color information in a centralized manner thereby facilitating maintenance of data. The printing system has a color information database DB in which color information is registered, and the color information has respective items of "color name", "ink name", "printing order", "screen angle", "process colorization instruction", "pseudo color" and "ink type". In print processing, it acquires a color name specified as the color of a prescribed area in digital data subjected to printing, and retrieves and extracts color information corresponding thereto from the color information registered in the color information database DB. Then, it performs raster image processing and performs print processing on the basis of the extracted color information. Also in confirmation output, it performs similar processing with the color information database DB managed in a centralized manner.

10 Claims, 8 Drawing Sheets

COLOR INFORMATION TABLE (PLATE INFORMATION TABLE)

| COLOR NAME | XXXX |
|---|---|
| INK NAME | XXXX |
| PRINTING ORDER | 005 |
| SCREEN ANGLE | 45 DEGREES |
| PROCESS COLORIZATION INSTRUCTION | ON / OFF |
| PSEUDO COLOR | YMCK, RGB |
| INK TYPE | Normal / Transparent / Opaque / Opaque Ignore |

FIG. 5

COLOR INFORMATION TABLE
(INTERMEDIATE COLOR OTHER THAN PLATE)

| COLOR NAME | XXXX |
|---|---|
| INK NAME | |
| PRINTING ORDER | |
| SCREEN ANGLE | |
| PROCESS COLORIZATION INSTRUCTION | |
| PSEUDO COLOR | YMCK, RGB |
| INK TYPE | |

```
                        G1
┌─────────────────────────────────────────────┐
│ COLOR INFORMATION SET SCREEN                │
├─────────────────────────────────────────────┤
│                                             │
│  COLOR NAME       [ GOLD        ▼] ~A1      │
│                                             │
│  INK NAME         [ GOLD  456   ▼] ~A2      │
│                                             │
│  PRINTING ORDER   [ 015 ] ~A3               │
│                              A4             │
│  SCREEN ANGLE     [ 30 ] DEGREES            │
│                      A5        A6           │
│  PROCESS COLORIZATION  ◎ON    ●OFF    A14   │
│  INSTRUCTION                                │
│                    A7   A8   A9   A10       │
│  PSEUDO COLOR 1   Y[80] M[20] C[10] K[5]  [SAMPLE] │
│  (YMCK)                                     │
│                                       A15   │
│  PSEUDO COLOR 2   R[224] G[192] B[73]  [SAMPLE] │
│  (RGB)             A11   A12   A13          │
│  INK TYPE         ●Normal ◎Transparent ◎Opaque ◎Opaque Ignore │
│                                             │
└─────────────────────────────────────────────┘
                    A16    A17      A18     A19
```

PRINTING SYSTEM, PRINTING METHOD AND RECORDING MEDIUM

TECHNICAL FIELD

The present invention relates to a technique of performing print processing, proof output processing and the like employing color information, and more particularly, it relates to conversion of color information to digital data (conversion to electronic data).

BACKGROUND TECHNIQUE

In a conventional digital printing apparatus, such a technique that information related to a specific color is transmitted to a later step with a memo written on a paper medium or the like is employed when performing print processing based on digital data.

While proof output or the like is performed for a use for confirming finishing of printed matter or the like also in a printing operation by such a digital printing apparatus, it is the present situation that color information in this proof output is subjected to management separately from color information related to final printed matter.

In the aforementioned technique by information transmission employing a memo or the like, however, it is difficult to prevent occurrence of errors, and there is such a problem that a step of a confirmation operation or the like is excessively required for preventing errors.

The situation also expressible as double management between print processing and proof processing as described above is problematic from a point of implementing efficient data management.

DISCLOSURE OF THE INVENTION

The present invention has been proposed in consideration of the aforementioned subjects, and a first object thereof is to provide a printing system capable of correctly reflecting supplied color information and a technique related thereto. A second object is to provide a technique of managing color information in a centralized manner thereby facilitating maintenance of data or the like.

The present invention is directed to a printing system performing printing on the basis of digital data, which comprises a) a printing control unit managing color information, having registration means registering color information including color names and prescribed information related to the color names, specified color name acquisition means acquiring a color name specified as the color of a prescribed area in digital data subjected to printing, color information extraction means retrieving and extracting color information corresponding to the acquired color name from the color information registered in the registration means and raster image processing means performing raster image processing on the basis of the extracted color information, and b) printing means performing print processing on the basis of rasterize-processed data obtained by the raster image processing.

Therefore, it is possible to correctly extract color information corresponding to a color name specified as the color of a prescribed area in digital data subjected to printing and perform print processing on the basis of the extracted color information. In other words, it is not necessary to set color information transferred by a memo or the like per printing dissimilarly to the prior art, but print processing correctly reflecting supplied color information in digital data subjected to printing is enabled.

The present invention is also directed to that the color information includes information as a color plate and the printing means performs the print processing on the basis of the information as the color plate included in the color information extracted by the color information extraction means.

The printing means performs print processing on the basis of the information as the color plate included in the color information extracted by the color information extraction means of the printing control unit, whereby it is possible to perform print processing while correctly reflecting information related to the color plate.

The present invention is also directed to that the color information extracted by the color information extraction means includes the ink name of a first ink to be charged in the printing means, and the printing control unit further comprises confirmation means comparing the ink name of a second ink packaged in the printing means with the ink name of the first ink thereby performing ink confirmation processing.

It compares the ink name of the first ink to be packaged in the printing means and the ink name of the second ink packaged in the printing means on the basis of the color information extracted by the color information extraction means thereby performing ink confirmation processing, whereby it is possible to automatically confirm whether or not setting of the inks is correct.

The present invention is also directed to that the print processing includes trap processing deciding the direction of creeping of a plate, and the trap processing is performed on the basis of information related to printing order included in the color information extracted by the color information extraction means.

It performs the trap processing deciding the direction of creeping of the plate on the basis of the printing order included in the color information extracted by the color information extraction means, whereby this trap processing can be performed while correctly reflecting supplied color information.

The present invention is also directed to that the printing system further comprises confirmation output means performing confirmation output of printed matter, the color information includes information related to a pseudo color for expressing the color corresponding to the color name, and the confirmation output means performs confirmation output processing on the basis of the information related to the pseudo color included in the extracted color information.

The color information includes information related to the pseudo color for expressing the color corresponding to the color name and the printing system retrieves and extracts the color information corresponding to the color of the prescribed area in the digital data subjected to printing from the registered color information and performs confirmation output processing on the basis of the information related to the pseudo color included in the extracted color information, whereby simulation display can be performed on the basis of correct information. Further, the color information related to the pseudo color is registered in association with various information related to the color plate employed for printing and the color information is managed in a centralized manner, whereby maintenance of data or the like is easy.

The present invention is also directed to that the registration means retrieves, extracts and registers color information included in digital data.

The registration means retrieves, extracts and registers the color information included in the digital data, whereby a registration operation can be efficiently performed.

The present invention is also directed to that it further comprises a client coupled to the printing control unit through a communication system, and the client can access the color information registered by the registration means through the communication system.

It comprises the client capable of accessing the registered color information through a communication line, whereby it becomes possible to perform management of color information also by the client by reading or writing the color information registered in the printing control unit as to the color information managed in a centralized manner in the printing control unit, and maintenance of data is more facilitated.

The present invention is also directed to a printing method performing printing on the basis of digital data, including a step of registering color information including color names and prescribed information related to the color names, a step of acquiring a color name specified as the color of a printing object area in digital data subjected to printing, a step of retrieving and extracting color information corresponding to the acquired color name from the registered color information, a step of performing raster image processing on the basis of the extracted color information, and a step of performing print processing on the basis of rasterize-processed data obtained by the raster image processing.

Thus, it is possible to correctly extract the color information corresponding to the color name specified as the color of the prescribed area in the digital data subjected to printing for performing print processing on the basis of the extracted color information. In other words, it is not necessary to set color information transferred by a memo or the like per printing dissimilarly to the prior art, but print processing correctly reflecting supplied color information in digital data subjected to printing is enabled.

The present invention is also directed to a computer-readable recording medium recording a program to be read and executed by a computer thereby making the computer function as the printing control unit in the aforementioned printing system. A similar effect can be attained also in this case.

The present invention is also directed to a computer-readable recording medium recording a program to be read and executed by a computer thereby making the computer function as the client in the aforementioned printing system. A similar effect can be attained also in this case.

BEST MODE FOR CARRYING OUT THE INVENTION

A. System Structure

<Outline>

Figure 1:
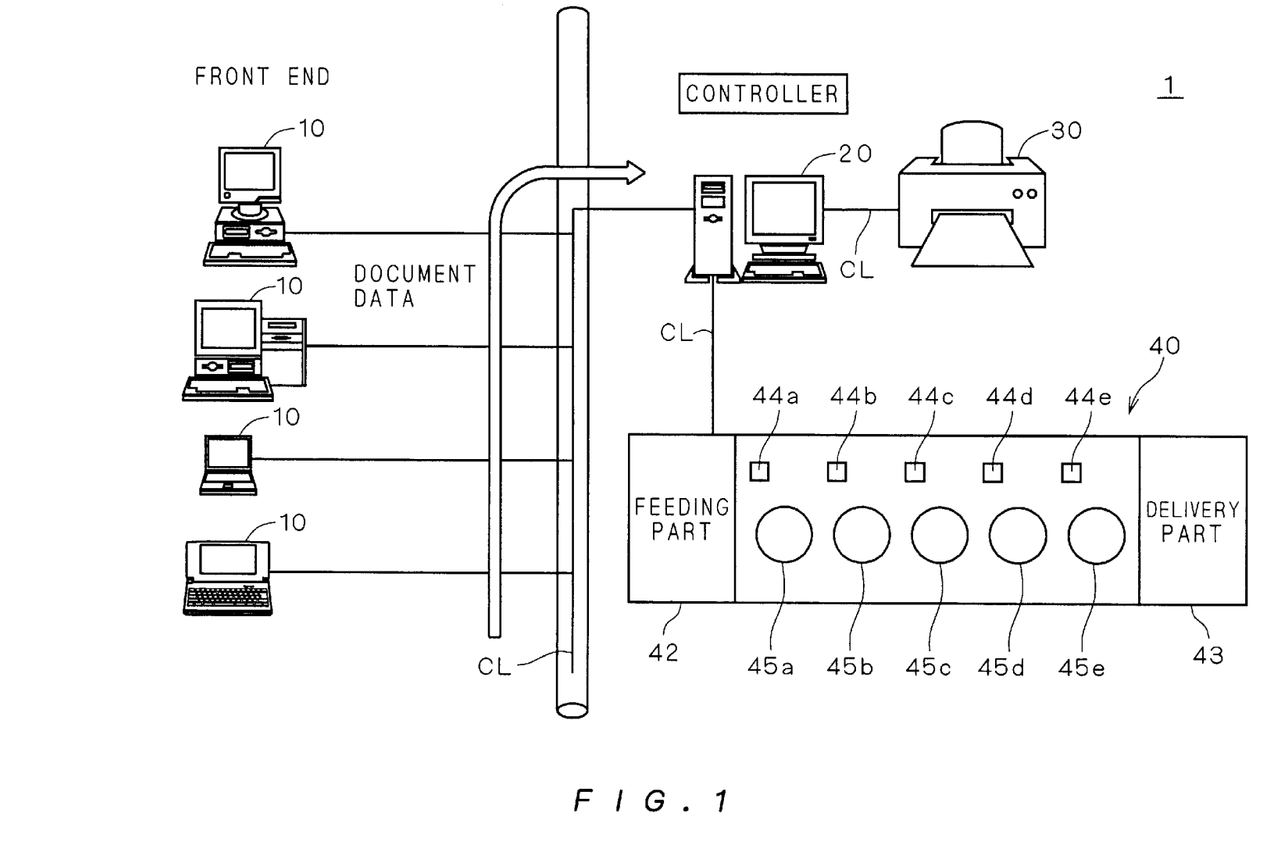
FIG. 1 is a diagram showing the outline of the system structure of a printing system 1 according to the present invention.

FIG. 1 is a diagram showing the outline of the system structure of a printing system 1 according to an embodiment of the present invention.

As shown in FIG. 1, this printing system 1 comprises a printing machine 40 performing printing with at least one plate (five plates in FIG. 1) on the basis of digital data and a printing control unit (hereinafter referred to as "controller") 20 rasterizing digital data subjected to printing and supplying the rasterized digital data to the printing machine 40. The controller 20 and the printing machine 40 are connected with each other through a communication line CL, and capable of transmitting/receiving various types of information to/from each other.

This printing system 1 is a printing system decomposing a document such as a document or an image of multi-color printing (four-color printing of YMCK, for example) to color data corresponding to respective plates by the controller 20 and performing printing of a plurality of colors by the respective plates in the printing machine 40 in a shared manner.

<Printing Machine 40>

The aforementioned printing machine 40 is a digital printer, exposure heads 44a to 44e performing exposure of machine plates and printing mechanisms 45a to 45e performing printing by the machine plates obtained by these exposure heads 44a to 44e are serially coupled in the inner part as to the respective ones of a plurality of printing colors, a feeding part 42 automatically performing feeding is packaged in the most upstream side, and a delivery part 43 automatically sorting and storing delivered printed matter is packaged in the most downstream side.

<Controller 20>

Figure 2:
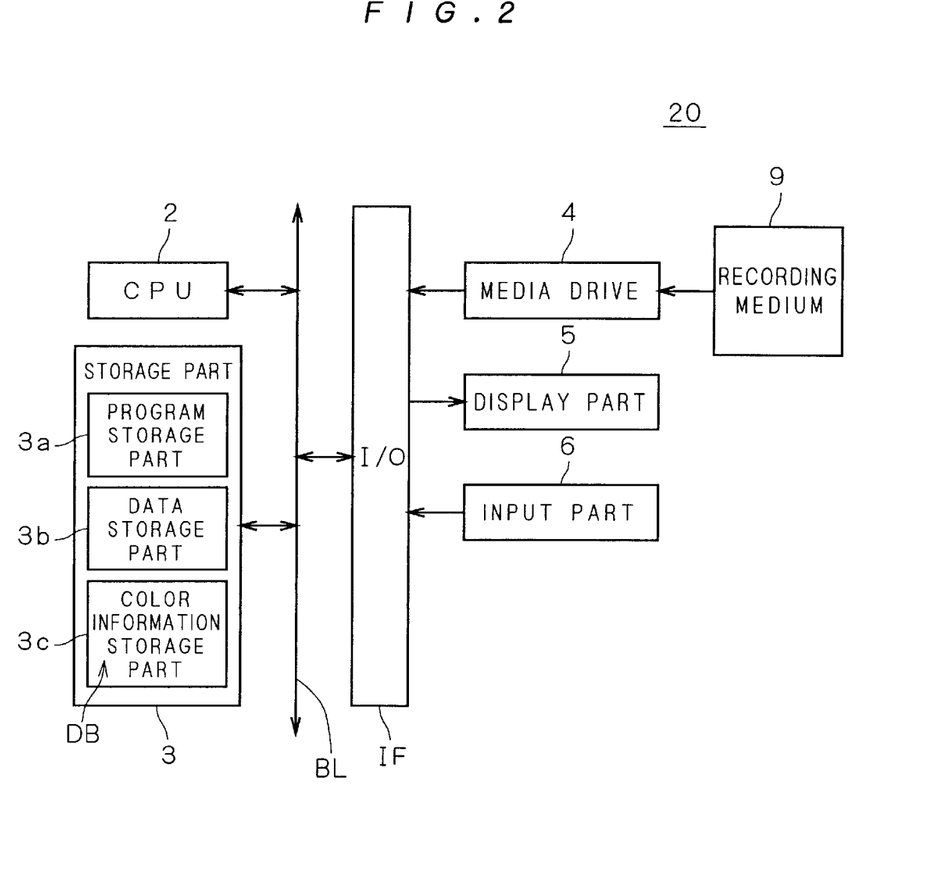
FIG. 2 is a conceptual diagram showing the hardware structure of a controller 20.

FIG. 2 is a conceptual diagram showing the hardware structure of the controller 20. The controller 20 is a computer system comprising a CPU 2, a storage part 3 including a semiconductor memory and a hard disk or the like, a media drive 4 reading information from various types of recording media, a display part 5 including a monitor and the like and an input part 6 including a keyboard and a mouse or the like. The CPU 2 is connected to the storage part 3, the media drive 4, the display part 5, the input part 6 and the like through a bus line BL and an input/output interface IF. The media drive 4 reads from a portable recording medium 9 such as a CD-ROM, a DVD (Digital Versatile Disk) or a flexible disk information recorded therein. This computer system reads a program from the portable recording medium 9 recording the program, thereby having various functions such as a color information database function related to color information described later, a registration function of a printing job and the like.

Figure 3:
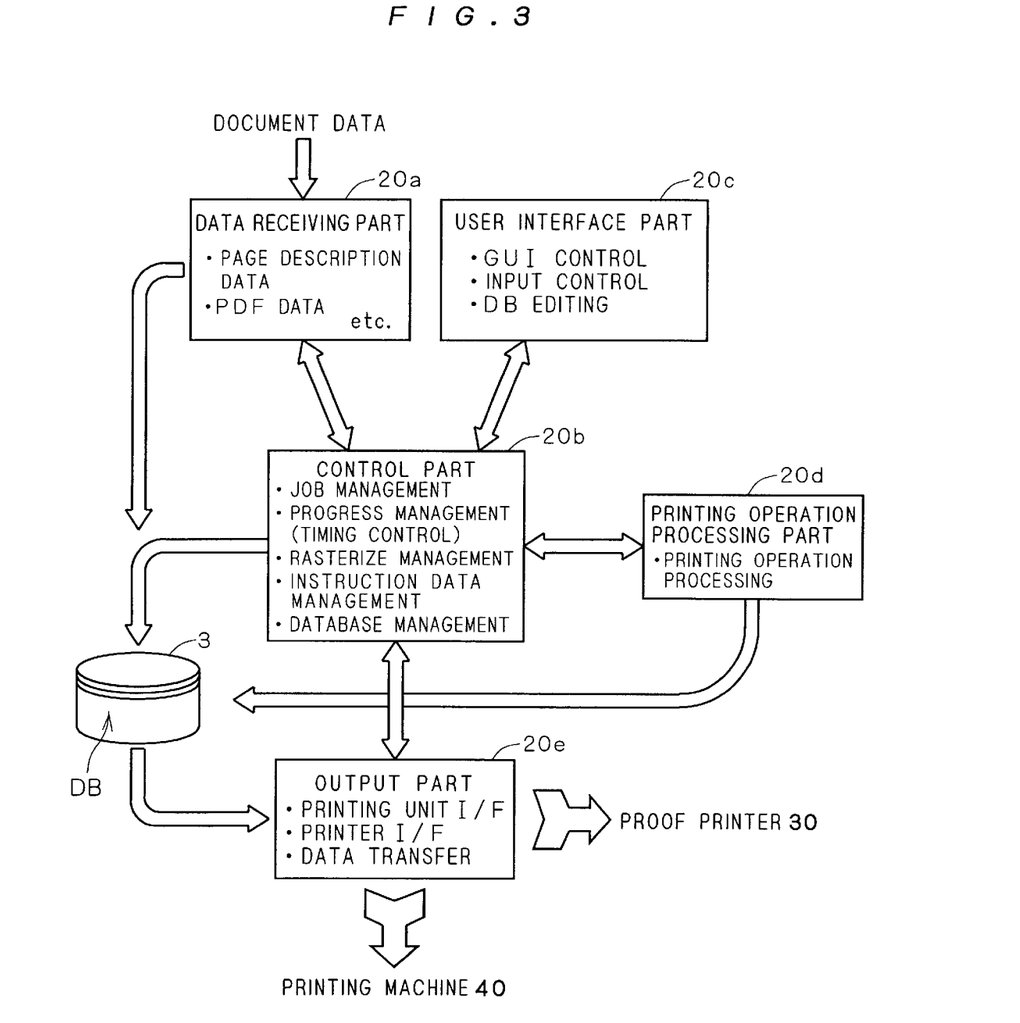
FIG. 3 is a functional block diagram of the controller 20.

FIG. 3 is a functional block diagram of the controller 20. The function of the controller 20 is hereafter described with reference to FIG. 3.

In a data receiving part 20a, it receives document data transmitted from a client 10 (see FIG. 1) described later arranged on a front end.

A control part 20b performs transfer of data with respective parts while having a job management function which is management of execution of the printing job including timing control described later, a progress management function which is management of the situation of progress of the printing job, a rasterize management function which is management of the situation of execution of rasterization, an instruction data management function which is management of an instruction input by an operator and a color information database management function performing management of a database related to color information described later.

A user interface part 20c has a GUI control function which is control of display by a GUI (Graphical User Interface), an input control function and an edit function (registration function) of the database such as addition or change of color information in a color information database described later. subjected to printing on the basis of the extracted color information.

Further, the generated data after raster image processing is output to the printing machine 40 through the output part 20e, and print processing is performed in the printing machine 40.

The printing operation processing part 20d not only generates the data for output processing in the printing machine 40 but also performs a similar operation when making a simulation image displayed on a color display as the display part 5 of the controller 20 and when making a rough image (thumbnail image) for reference or the like.

<Client 10>

The printing system 1 (see FIG. 1) comprises a plurality of external terminal units (hereinafter referred to as "client computers" or simply as "clients") 10 connected to the controller 20 through the communication line CL on its front end. This client 10 is now described.

The client 10 is a computer system having a hardware structure similar to the aforementioned controller 20, and comprises an internal structure of a CPU, a memory, a hard disk and the like, a color display as a display part and a peripheral device such as a keyboard as an input part.

At this point, the client 10 has functions similar to the controller 20, while the color information database DB storing color information is not constructed in the client 10 among the same. The color information database is constructed only in the controller 20, and the color information related to the printing system 1 is managed in a centralized manner.

The client 10 is capable of accessing (reading and/or writing) the color information database DB constructed in the storage part 3 in the controller 20 through the In a print operating processing part 20d, it performs raster image processing (or rasterize processing) on digital data subjected to printing. Thus, output data for each plate is generated by decomposing document data to color data corresponding to the respective plates of the printing machine 40. In this raster image processing, information of the color information database DB of the storage part 3 is employed.

An output part 20e functions as an interface with the printing machine 40 and a proof printer 30 (described later), and performs data transfer to the exterior or the like.

Further, the storage part 3 (see also FIG. 2) has a program storage part 3a storing all or part of the read program a data storage part 3b storing document data as the digital data subjected to print processing etc. and data after rasterization obtained by rasterizing the document data, and a color information storage part 3c storing the color information stored as the database (color information database) DB. The color information is managed through the color information database DB stored in this color information storage part 3c.

This color information database DB has a registration function of registering color information (see FIG. 4) including a prescribed color name (color name) and prescribed information related to this color name. This registration is performed through the user interface part 20c. As described later, it is also possible to previously automatically retrieve, extract and register it from various types of document data received in the data receiving part 20a.

The printing operation processing part 20d acquires a color name specified as the color of a prescribed area in the document data subjected to printing, and retrieves and extracts color information corresponding to the acquired color name from the color information registered in the color information database. The printing operation processing part 20d performs raster image processing related to the document data communication line CL, i.e., reading the color information from the color information database DB or writing color information. As to the color information managed in the controller 20 in a centralized manner, therefore, it becomes possible to read or write the color information thereby performing management of the color information also by the client 10, whereby maintenance of data is facilitated.

Further, each client 10 is also capable of creating and editing document data (electronic page data) such as data by a page description language, PDF data or the like, preserving the same in the internal hard disk, transmitting these data to the controller 20 and performing an operation such as registration of the printing job described later.

Also in the client 10, it is possible to make simulation display on the color display as the display part of the client 10, similarly to the controller 20. Thus, it is possible to confirm an output state of printed matter on the color display of the client 10 in advance of print processing by the printing machine 40. Also in this case, raster image processing is performed on the basis of the information of the color information database DB constructed in the storage part 3 of the controller 20, to perform formation of a simulation image. In this case, the raster image processing may be performed on the controller 20 side, or may be performed on the client 10 side.

Not only the simulation display but also a rough image (thumbnail image) for reference or the like can be displayed in the color display as the display part of the client 10. Thus, the contents of the printed matter can be confirmed on the color display in advance of print processing by the printing machine 40.

<Proof Output>

The printing system 1 also comprises the proof printer 30 (see FIG. 1) for trially making printing output for proofing. This proof printer 30 is connected to the controller 20 through the communication line CL, and output processing is performed on the basis of an output instruction from the controller 20. Thus, the final output state of printed matter can be confirmed in advance of regular press by the printing machine 40. As described later, print processing is performed with the color information registered in the controller 20 also in printing output for proofing in this proof printer 30.

At this point, a concept including also simulation display in the display parts such as the color displays of the controller 20 and the client 10 and display of the rough image for reference in addition to the proof output (proof printing output) is defined as "confirmation output" performing confirmation output of printed matter in this specification.

<Color Information>

Figure 4:
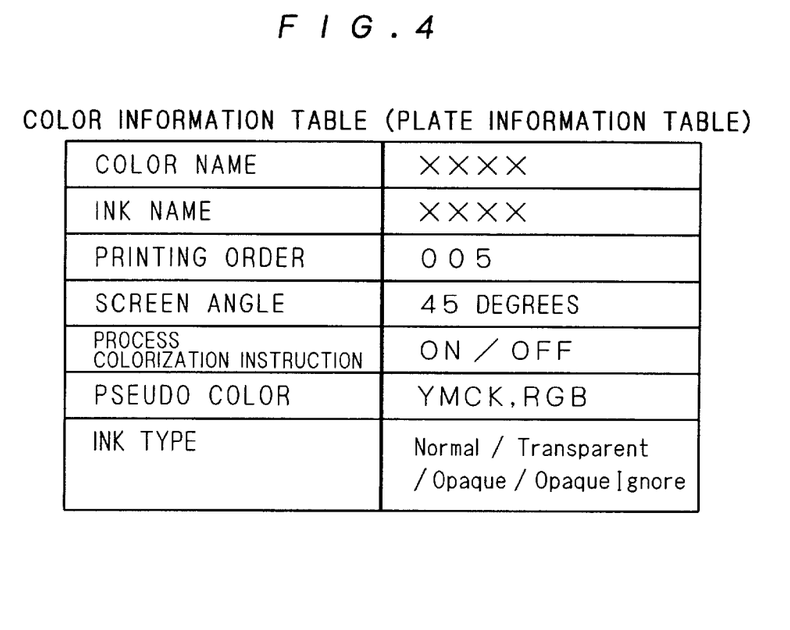
FIG. 4 is a diagram showing the contents of color information.

The "color information" registered in the color information database DB is now described. FIG. 4 is a diagram showing the contents of the "color information". At this point, a case of specifying color information of colors employed as plates (color plates) is described. As the plates, there is a case of employing a color such as "gold" referred to as a specific color directly as a "plate" in addition to a case of employing four basic colors of Y (yellow), M (magenta), C (cyan) and K (black), for example. Concretely, color information as to each color employed as such a plate (color plate) is registered as that including the following information.

As shown in FIG. 4, the color information has respective items of "color name", "ink name", "printing order", "screen angle", "process colorization instruction", "pseudo color" and "ink type". The respective items are now successively described.

First, the "color name" means the name of the color. A designer of a document or the like subjected to printing can perform specification of "color" in each area of the printing object. Then, it follows that the color in each area is specified and preserved in this color name in document data.

The "ink name" is the name of an ink to be charged in the printing machine 40 as that expressing the color corresponding to the plate, and a name such as a concrete trade name of the ink capable of specifying the ink can be described. Thus, it becomes possible to specify the ink to be employed for printing in practice in correspondence to the "color name". For example, the trade name "yellow 123" as the ink name can be registered in correspondence to "yellow" as the color name. It can be similarly set also for a specific color, and the trade name "gold 456" as the ink name can be registered in correspondence to "gold" as the color name, for example. The "yellow 123" and the "gold 456" are illustrated as the trade names.

Further, the "printing order" is an index employed at the time of setting the processing order for performing printing of each plate when a plurality of plates are present. More concretely, a prescribed numerical value is supplied to each color name as an absolute value, and print processing of each plate is performed in order where these numerical values are small or large. This is based on, in correspondence to that it is recognized as an absolutely different color in a printed state when the printing order is different in print processing employing a plurality of color plates, that it is necessary to prevent such a situation and set proper printing order of color plates. In correspondence to each plate, a color responsive to largeness/smallness of transmittance of each color (or largeness/smallness of concentration of the color) is set as an index expressing the printing order.

The "screen angle" is a screen angle set every color plate. In order to prevent occurrence of moire, values different from each other are preferably set for the respective plates.

Further, the "process colorization instruction" is an instruction supplied to a specific color other than YMCK and setting performing specification as to whether to make printing with an ink for the specific color charged in the printing machine 40 or make printing with only a process color (e.g., any color of the four colors YMCK), and either value of ON and OFF is set.

If the process colorization instruction is "off", for example, raster image processing is performed on the assumption of employing an ink expressed by an ink name corresponding to the color name of the specific color, i.e., a dedicated ink for the specific color, when expressing the specific color, and thereafter print processing is performed with this dedicated ink. If the process colorization instruction is "on", on the other hand, it performs raster image processing performing color decomposition on the plate corresponding to the process color without employing the dedicated ink for the specific color, and print processing with only the process color is performed.

Description is now made on the "pseudo color". The "pseudo color" is information related to a color employed when expressing the color not by the color specific to the color but by a pseudo color.

When performing simulation on the color display, for example, RGB expression corresponding to the "color name" can be defined. Concretely, this RGB expression is supplied by combination of concentration values (brightness values) of the respective color components R (red), G (green) and B (blue).

It is also possible to define YMCK expression at the time of employment for output to the proof printer 30. Concretely, the YMCK expression can be supplied by combination (Y, M, C, K) of concentration values (brightness values) of the respective color components.

Further, it is also possible to define YMCK expression for the specific color such as "gold", and concrete values of the respective color components of YMCK at the time of performing specific color expression by the process color can be decided when the process colorization instruction is on in association with the aforementioned "process colorization instruction".

Thus, (1) information by RGB expression employed for simulation display on the color display, (2) information by YMCK expression when employed for proof printing output and (3) information by YMCK expression in regular press set for the specific color or an intermediate color (described later) are included in the information as the "pseudo color". While it is assumed that the same information is shared in the following description as to the information of (2) and (3) among these, the same may be separately set in order to enable more flexible correspondence.

The "ink type" is a parameter defining the type of the ink, and the contents of processing in trap processing (described later) are decided in response to this parameter. More concretely, any of a plurality of parameters (Normal/Transparent/Opaque/Opaque Ignore) is set, and in what situation what contents of trap processing to perform is decided in correspondence to the set parameter.

Figure 5:
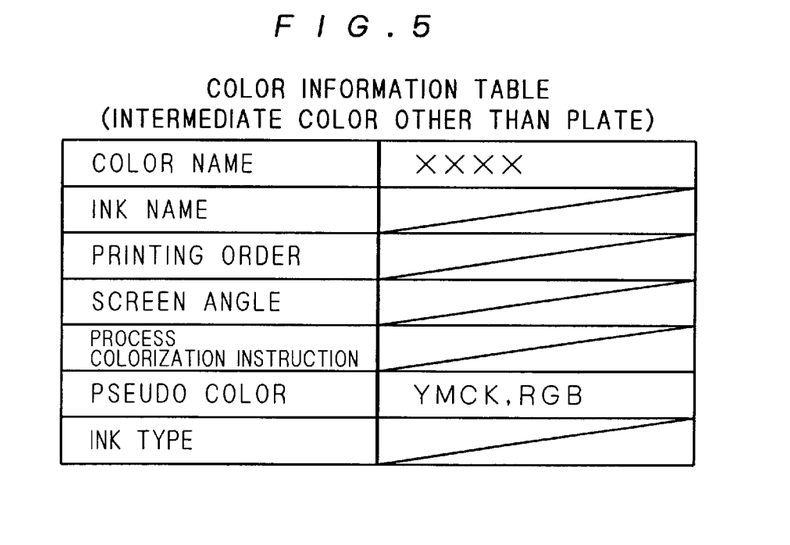
FIG. 5 is a diagram showing the contents of color information related to intermediate colors.

While registration as to the color information related to the color employed as the plate has been described in the above, the color information is not restricted to this but a pseudo color for an intermediate color other than the color (YMCK here) employed as the plate can be defined as part of the color information, for example. For example, YMCK expression corresponding to each intermediate color such as red, green, blue, lemon, orange or yellowish green can be previously defined as the pseudo color. According to this, it becomes possible to reproduce an intermediate color specified by the designer in printing. FIG. 5 is a diagram showing an example thereof, and shows such a case that YMCK expression and RGB expression of a pseudo color are specified for "color name: xxxx".

Also when the color information thus expresses color information related to an intermediate color, a template similar to that in the case of expressing color information as a plate can be employed, and only necessary items may be described. When information related to the item "pseudo color" is registered as to color information related to an intermediate color, for example, the registered information can be utilized in later print processing.

B. Operation

<Outline>

Figure 6:
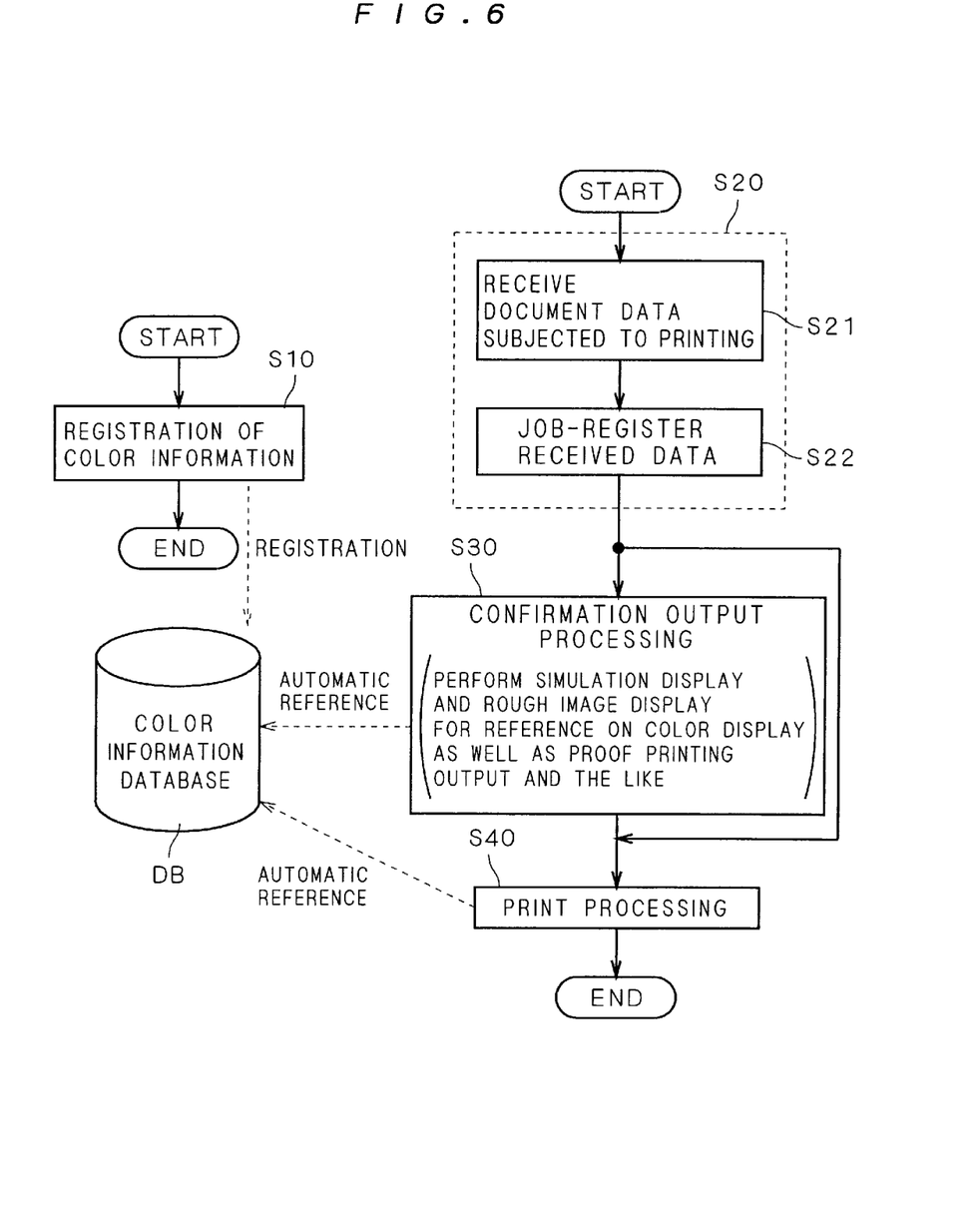
FIG. 6 is a flow chart showing operations of the printing system 1.
Figure 7:
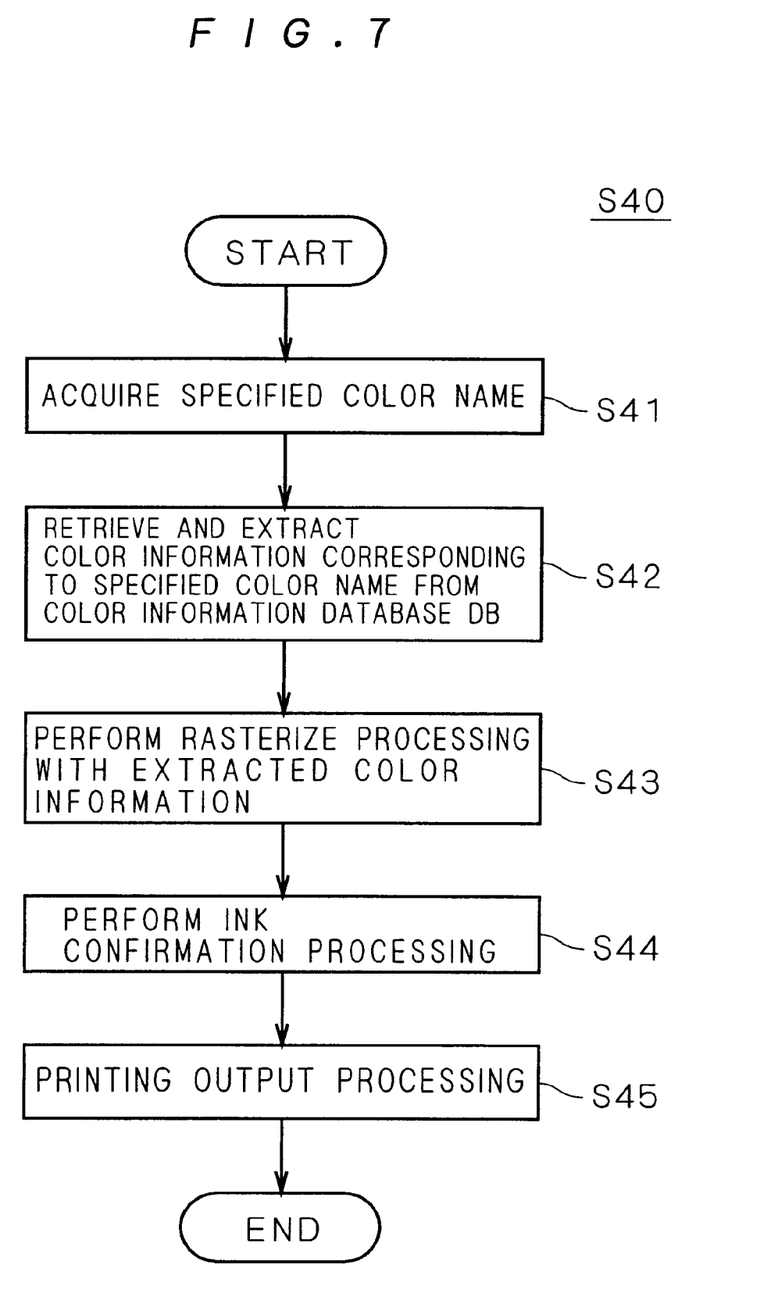
FIG. 7 is a flow chart showing a flow related to a step S40.
Figure 8:
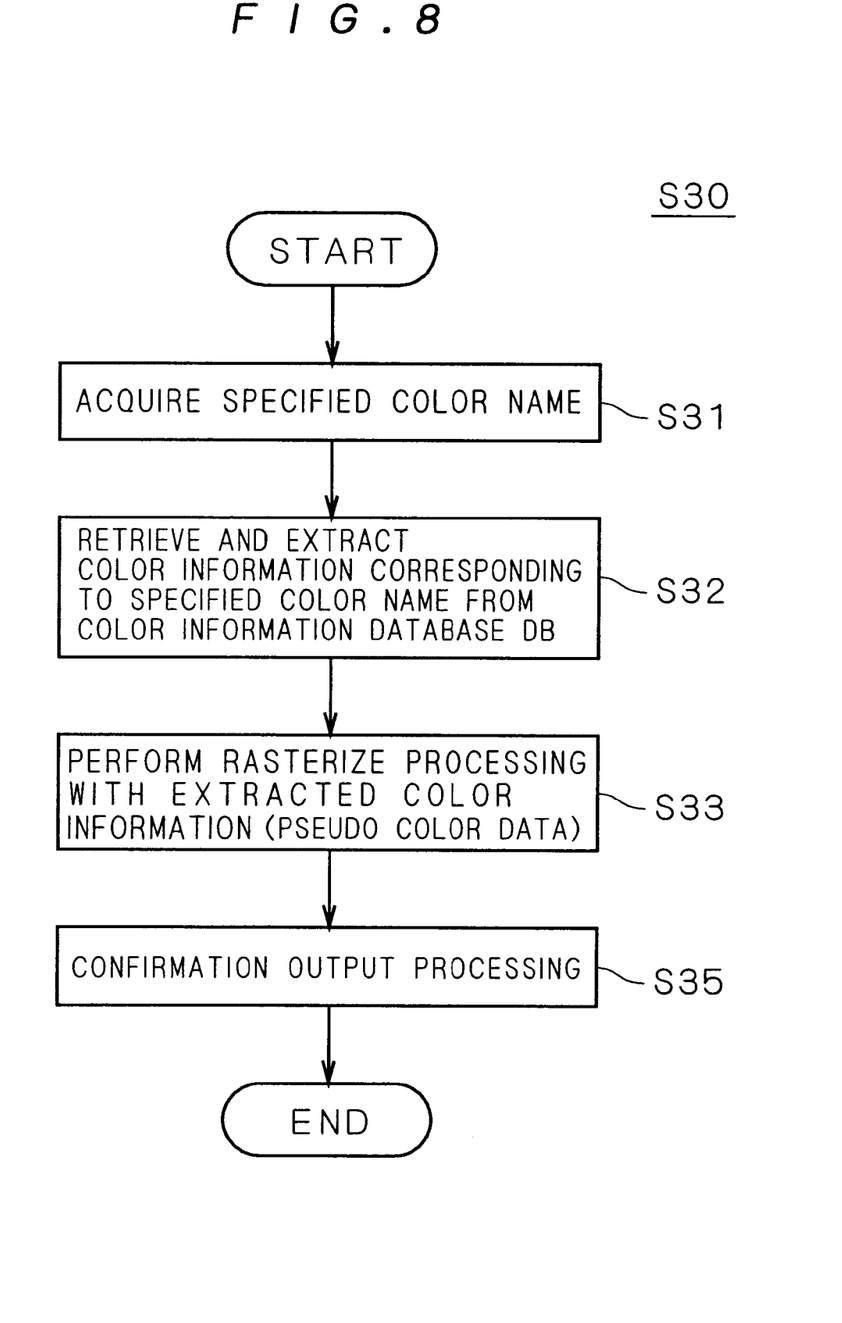
FIG. 8 is a flow chart showing a flow related to a step S30.

FIG. 6 to FIG. 8 are flow charts showing operations of the printing system 1. FIG. 6 is a flow chart showing an overall flow, and FIG. 7 and FIG. 8 are flow charts showing flows related to parts (a step S40 and a step S30) thereof. The operations of the printing system 1 are now described with reference to these figures.

As shown in FIG. 6, it performs job registration of document data subjected to printing at a step S20 after registration of color information is performed at a step S10 in this printing system 1, and confirmation output processing (step 30) and print processing (step S40) are performed as to this document data with color information registered in the color information database DB. Each operation is now described in detail.

<Registration of Color Information>

First, it performs registration of the color information at the step S10. This color information is color information including the color name and the prescribed information related to this color name, as described above. Registration of this color information is performed with the input part 6 of the controller 20 or the like.

At this point, description is made on a case of performing registration of color information related to each color plate as to five plates in total including four plates related to the respective colors "Y", "M", "C" and "K" and one plate related to the specific color ("gold" here, hereinafter abbreviated as "GD") in the printing system 1.

Figure 9:
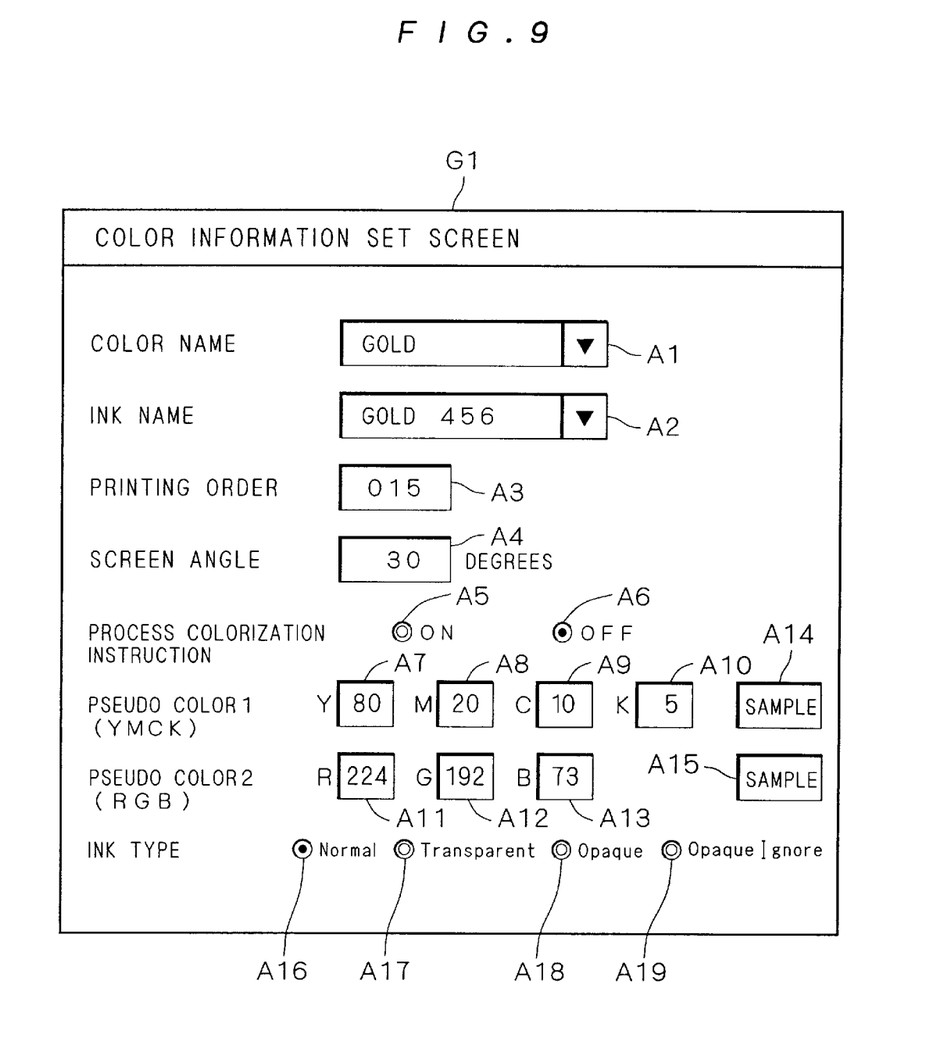
FIG. 9 is a diagram showing a screen G1 for setting color information.

Setting of each color plate can be performed with a screen G1 for setting color information shown in FIG. 9. Setting of color information related to the "GD" plate is now described.

First, it inputs "gold" in a column A1 as the color name. Then, it inputs "gold 456" in a column A2 as the ink name, inputs "015" in a column A3 as the printing order, and inputs "30" (degrees) in a column A4 as the screen angle. At this point, the ink name can also be selected, from a plurality of previously registered ink names and input in addition to the direct input in the column A2. Further, it selects a column A6 and supplies an off instruction in relation to the process colorization instruction. Either the column A5 or the column A6 is selected, so that the other one enters a non-selected state when one enters a selected state. As to a pseudo color 1 (YMCK expression) and a pseudo color 2 (RGB expression), it inputs respective values in respective columns A7 to A13, thereby inputting respective values shown in the figure. As to each of the pseudo color 1 and the pseudo color 2, it is also possible to press any of respective buttons A14 and A15 thereby calling a color sample register screen and setting the respective ones of each YMCK value and RGB value set following the color sample register. Then, it sets the ink type. This setting is performed by selecting one from four choices A16 to A19. At this point, it shows a case where "Normal" is selected.

Thus, input related to the specific color "gold" is performed. The aforementioned respective columns may not necessarily be totally input at the time of first registration. In other words, only necessary items may be set. When performing only proof print processing by the proof printer 30, for example, only information (information related to the aforementioned "pseudo color 1") necessary for the proof print processing may be set and the remaining information may be set up to before the print processing performed later. It is also possible to facilitate input of unset items in the print processing.

Also as to the respective color plates of the remaining "Y", "M", "C" and "K", it similarly registers color information. Also as to color information related to a color other than the color plates, i.e., an intermediate color, it properly performs input at need.

While the above description has been made as to the case of performing a registration operation of color information with the input part 6 of the controller 20 or the like, it is also possible to perform a registration operation of color information also when employing the input part of the client 10 or the like. In relation to input of color information, further, it is also possible to perform the same with an automatic registration function described later in addition to input performed by an operator as described above.

<Job Registration>

Then, job registration of registering a printing job to be executed is performed by specifying the document data subjected to printing at the step S20 (FIG. 6).

For example, the operator specifies document data created and/or edited in the client 10 (FIG. 1) and transmits the same from the client 10 to the controller 20 along with job contents data. The controller 20 receives the transmitted document data (step S21). Then, it registers these received data, thereby performing job registration (step S22). As described above, the control part 20b of the controller 20 performs management of execution of printing jobs transmitted from the plurality of clients 10. Thus, the document data to be printed is specified by the job management function by this control part 20b.

Thereafter confirmation output processing (step S30) and print processing (step S40) are performed on the specified document. At this point, the print processing (step S40) is first described.

<Printing Output>

At the step S40, print processing is performed on the document data specified as the printing object at the step S20. FIG. 7 is a flow chart illustrating detailed operations of the step S40, and each operation is described with reference to FIG. 7.

First, at a step S41, the printing operation processing part 20d (FIG. 3) of the controller 20 acquires the color name specified as the color of the prescribed area in the document data subjected to printing. More concretely, it comes to acquire a specified color name included in object data corresponding to the prescribed area in the document data.

Then, at a step S42, the printing operation processing part 20d retrieves and extracts the color information corresponding to the color name acquired at the step S41 from the color information registered in the color information database DB at the step S10.

Further, at a step S43, the printing operation processing part 20d performs raster image processing related to the document data subjected to printing on the basis of the color information extracted at the step S42.

In this raster image processing, the value of the "screen angle" registered in correspondence to each color plate is employed.

When the color name "gold" which is the specific color is specified as the color of the prescribed area, it distinguishes the way of color decomposition of the raster image processing in response to whether the "process colorization instruction" included in the extracted corresponding color information is on or off. When the "process colorization instruction" is on, raster image processing is performed with the YMCK expression of the pseudo color included in this color information. When the "process colorization instruction" is off, on the other hand, raster image processing is performed on the assumption that output by the "GD" plate is accompanied without employing the information of the pseudo color included in this color information.

Further, trap processing is performed at need in the aforementioned raster image processing. The trap processing stands for processing of making one area creep into another area for preventing "plate misregistration" in two areas generated in different plates to be adjacent areas in final printing, the so-called "creeping of the plate". Concretely, it provides overlapping portions in adjacent two areas for preventing the "plate misregistration" phenomenon.

When the concentrations of adjacent areas are at the same degree, for example, it is possible to prevent "plate misregistration" by expanding an area of a color (the so-called pale color) having large transmittance by a prescribed width and making the same creep into another area having a color (the so-called dark color) having relatively small transmittance. At this point, the "printing order" is information reflecting the transmittance of the plate in the aforementioned color information, and hence it becomes possible to employ the information related to this "printing order" and decide what area to expand in response to largeness/smallness of the value. In other words, it is possible to perform trap processing by employing the information related to the "printing order" in the aforementioned color information.

When the concentrations of adjacent areas are different from each other and the "concentration" (e.g. dot percent) of this area is small in the color (the so-called dark color) having small transmittance as compared with the color (the so-called pale color) having large transmittance, it may contrarily be preferable to expand the area of the color having small transmittance by a prescribed width and make the same creep into the other area. At this time, trap processing is performed by further employing information related to the "concentration" included in object data corresponding to each area. In other words, trap processing is performed with the information related to the "printing order" in the aforementioned information and the information related to the "concentration" included in the object data corresponding to both areas adjacent to each other in the document data.

In this trap processing, the information related to the "ink type" in the aforementioned color information can be further employed. It is possible to decide the contents of the trap processing in response to the set value of this "ink type". It is possible to distinguish and process whether or not to perform trap processing in response to various types of situations by utilizing this information.

Then, at a step S44, ink confirmation processing is performed by the printing operation processing part 20d (FIG. 3). At this point, confirmation processing related to five color plates in total is performed. Concretely, it confirms whether or not a correct ink corresponding to each color plate to be printed is charged in correct order in each of the five printing mechanisms 45a to 45e of the printing machine 40.

The arrangement order (printing order) of the color plates is set on the basis of the information of the "printing order". These five plates of "Y", "M", "C", "K" and "GD" are sorted and arranged according to the magnitudes of the index values of the "printing order" thereof in ascending order or descending order. Thus, proper printing order is decided, and set as that to be arranged in the respective printing mechanisms 45a to 45e according to the printing order. When order of "Y", "M", "C", "GD" and "K" is set as proper printing order, for example, inks corresponding to the "Y" plate, the "M" plate, the "C" plate, "GD" plate and the "K" plate are set to be mounted on the printing mechanism 45a, the printing mechanism 45b, the printing mechanism 45c, the printing mechanism 45d and the printing mechanism 45e respectively.

Then, it confirms that ink names of the inks packaged (actually charged) in the respective printing mechanisms 45a to 45e at this time are identical to the ink names of the inks to be charged in the printing mechanisms included in the extracted color information corresponding to the respective colors, thereby performing ink confirmation processing. The ink names of the irks packaged in the respective printing mechanisms 45a to 45e can be obtained by reading identification codes such as bar codes on container surfaces of the packaged inks or by such an operation that a mounter or the like inputs and registers the names of the mounted inks in ink packaging.

When correct inks are not arranged on correct positions in this confirmation processing, a warning signal is generated and the operator receives the warning signal and correctly rearranges these inks. After it is confirmed that the correct inks are arranged on the correct positions, it advances to a next step S45.

At the step S45, it performs output processing (printing output processing) to the printing machine 40. The data rasterized at the aforementioned step S43 is output to the printing machine 40 by the output part 20e (see FIG. 3). The printing machine 40 performs print processing with the painting mechanisms 45a to 45e for the respective plates or the like on the basis of the received data.

At this point, the printing system 1 registers the color information including the color names and the prescribed information related to the color names in the color information database DB, then acquires the color name specified as the color of the prescribed area in the digital data subjected to printing, retrieves and extracts the color information corresponding to the acquired color name from the color information registered in the color information database DB, performs raster image processing on the basis of the extracted color information and performs print processing on the basis of the rasterize-processed data, whereby the color information corresponding to the color name specified as the color of the prescribed area in the digital data subjected to printing can be correctly extracted for performing print processing on the basis of the extracted color information. In other words, it is not necessary to set color information transferred by a memo or the like every printing dissimilarly to the prior art, but print processing correctly reflecting supplied color information in the digital data subjected to printing is enabled.

In particular, print processing is performed on the basis of the information as the color plate included in the color information, whereby it is possible to perform print processing while correctly reflecting the information related to the color plate.

This color information includes the ink name of the ink to be charged in each printing mechanism of the printing machine 40 and the controller 20 performs ink confirmation processing by comparing the ink name of the ink to be charged included in the extracted color information and the ink name of the ink packaged in the printing machine 40 with each other, whereby it is possible to automatically confirm whether or not setting of the ink is correct.

Further, it performs trap processing deciding the direction of creeping of the plate on the basis of the printing order included in the color information extracted as corresponding to the area from the color information database DB, whereby it is possible to perform this trap processing while correctly reflecting supplied color information.

<Confirmation Output>

Then, the step S30 (FIG. 6) is described. The step S30 is adapted to perform confirmation output performed in advance of the print processing by the printing machine 40.

As the confirmation output, there exists proof printing output by the proof printer 30 or output such as simulation display on the color display and rough image display for reference, as described above.

FIG. 8 is a flow chart illustrating detailed operations at the step S30. At this point, each operation in simulation display on the color display is described with reference to FIG. 8.

In simulation display on the color display, output processing correctly reflecting the color information is enabled by performing raster image processing or the like with the information related to the "pseudo color" in the color information. Therefore, it performs an operation substantially similar to each operation at the step S40.

First, the printing operation processing part 20d of the controller 20 acquires the color name specified as the color of the prescribed area in the document data subjected to printing at a step S31.

Then, at a step S32, it retrieves and extracts the color information corresponding to the color name acquired at the step S31 from the color information registered in the color information database at the step S10.

Further, at a step S33, the printing operation processing part 20d performs raster image processing related to the document data subjected to printing and generates a simulation image on the basis of the color information extracted at the step S32. At this point, it performs raster image processing with the information related to the RGB expression of the pseudo color included in the color information of each color. In simulation display, the information of the "process colorization instruction" may not be employed but a proper simulation image related to the color can be generated also as to the specific color "gold", for example, if employing the information related to the pseudo color.

At a step S35, output processing (confirmation output processing) of the obtained simulation image to the color display is performed. Thus, the data rasterized at the aforementioned step S33 is output to the color display which is the display part of the controller 20 or the client 10, and the simulation image is displayed on the color display.

While simulation display on the color display has been described in the above, it is possible to implement output of reference rough image display (thumbnail display) or the like on the color display also by similar operations.

Also as to proof printing output by the proof printer 30, further, it is possible to perform confirmation output processing by processing similar to the above, although this is different in a point that it performs raster image processing with the information related to the YMCK expression of the pseudo color included in the color information of each color.

At this point, the color information includes the information related to the pseudo color for expressing the color corresponding to the color name and the printing system 1 retrieves and extracts the color information corresponding to the color of the prescribed area in the digital data subjected to printing from the color information registered in the color information database DB and performs confirmation output processing on the basis of the information related to the pseudo color included in the extracted color information, whereby simulation display can be performed on the basis of correct information. Further, the color information related to the pseudo color is registered in association with various information related to the color plate employed for printing and the color information is managed in a centralized manner, whereby maintenance of data or the like is facilitated.

C. Others

While the color information has been registered in the color information database DB by manual input through a set screen (see FIG. 9) in the aforementioned embodiment, it is not restricted to this but may automatically retrieve, extract and register the color information included in the document data. Concretely, it retrieves and extracts the color information (e.g., information related to the color name and the pseudo color corresponding to the color name) in the document data in advance of print processing, and additionally registers unregistered color information. This additional registration, performed on color information whose color name itself is unregistered, is also performed on such color information that all or part of color information other than the color name is unregistered although the color name is already registered. It is possible to improve efficiency of the registration operation by such an automatic registration function of the color information. When already registered information is present, consistency of data can be taken by taking action of automatically performing overwriting or confirming whether or not overwriting may be performed to the operator.

In this printing system 1, it can access the color information database DB through the controller 20 and/or the client 10 for performing a maintenance operation (registration operation) such as addition, change, deletion or the like of the color information database DB. In this maintenance operation of the color information database DB, it is possible to improve efficiency of the maintenance operation by employing various types of editing functions. As these editing functions, there are various types of sorting functions such as input order, printing order, the Japanese syllabary order and the like and various types of group display functions such as identical screen angle group display, identical used ink name group display and the like, for example. In relation to the color information, it is also possible to expand the color information by adding a registration item other than the aforementioned registration items ("color name", "printing order", "ink name" and the like) or the like.

While the printing machine 40 has been illustrated as a single printing apparatus comprising a plurality of printing mechanisms in the aforementioned embodiment, the printing machine 40 may be that of a mode comprising a plurality of printing units each having one or a plurality of printing mechanisms as a single unit.

While that of a system having an exposure head every plate has been illustrated as the printing machine 40 in the aforementioned embodiment, it may be another system (e.g., an ink jet system) having no exposure head so far as the same performs print processing per color (plate) through color decomposition.

While the client 10 has been connected with the controller 20 through the communication line CL and so structured that communication employing a communication system by wire is enabled, it may be structured to be communicable with a communication system by wire. Also in this case, the client 10 is enabled to access the color information database DB in the controller 20 through a communication system by radio.

While the present invention has been described in detail, the foregoing description is in all aspects illustrative and the present is not restricted thereto. It is understood that numerous unillustrated modifications can be devised without departing from the scope of the present invention.

What is claimed is:

1. A printing system (1) performing printing on the basis of digital data, comprising:

a) a printing control unit (20) managing color information, having:

registration means registering color information including color names and prescribed information related to said color names, specified color name acquisition means acquiring a color name specified as the color of a prescribed area in digital data subjected to printing, color information extraction means retrieving and extracting color information corresponding to said acquired color name from the color information registered in said registration means, and raster image processing means performing raster image processing on the basis of said extracted color information; and b) printing means (30) performing print processing on the basis of rasterize-processed data obtained by said raster image processing.

2. The printing system according to claim 1, wherein said color information includes information as a color plate, and said printing means performs said print processing on the basis of the information as the color plate included in said color information extracted by said color information extraction means.

3. The printing system according to claim 2, wherein said color information extracted by said color information extraction means includes the ink name of a first ink to be charged in said printing means, and said printing control unit further comprises confirmation means comparing the ink name of a second ink packaged in said printing means with the ink name of said first ink thereby performing ink confirmation processing.

4. The printing system according to claim 3, wherein said print processing includes trap processing deciding the direction of creeping of a plate, and said trap processing is performed on the basis of information related to printing order included in the color information extracted by said color information extraction means.

5. The printing system according to claim 4, wherein said printing system further comprises confirmation output means performing confirmation output of printed matter, said color information includes information related to a pseudo color for expressing the color corresponding to said color name, and said confirmation output means performs confirmation output processing on the basis of the information related to said pseudo color included in said extracted color information.

6. The printing system according to claim 5, wherein said registration means retrieves, extracts and registers color information included in digital data.

7. The printing system according to claim 6, further comprising:

a client (10) coupled to said printing control unit through a communication system, wherein said client can access said color information registered by said registration means through said communication system.

8. A printing method performing printing on the basis of digital data, including:

a step (S10) of registering color information including color names and prescribed information related to said color names;

a step (S41) of acquiring a color name specified as the color of a printing object area in digital data subjected to printing;

a step (S42) of retrieving and extracting color information corresponding to said acquired color name from said registered color information;

a step (S43) of performing raster image processing on the basis of said extracted color information; and a step (S45) of performing print processing on the basis of rasterize-processed data obtained by said raster image processing.

9. A computer-readable recording medium (9) recording a program to be read and executed by a computer to carry out the steps of:

a) managing color information by:
  a-1) registering color information including color names and prescribed information related to said color names,
  a-2) acquiring a color name specified as the color of a prescribed area in digital data subjected to printing,
  a-3) retrieving and extracting color information corresponding to said acquired color name from said registered color information, and
  a-4) performing raster image processing on the basis of said extracted color information; and b) controlling to perform print processing on the basis of said rasterize-processed data.

10. A computer-readable recording medium (9) recording a program to be read and executed by a computer, said computer performing as a client (10) which is a part of a printing system comprising a printing control unit (20) managing color information and printing means (30) performing print processing, said program, when executed, causing said computer to carry out the steps of:

a) accessing said printing control unit (20) for managing color information by:
  a-1) registering color information including color names and prescribed information related to said color names,
  a-2) acquiring a color name specified as the color of a prescribed area in digital data subjected to printing,
  a-3) retrieving and extracting color information corresponding to said acquired color name from said registered color information, and
  a-4) performing raster image processing on the basis of said extracted color information; and b) controlling said printing means (30) for performing print processing on the basis of said rasterize-processed data.

* * * * *